Jan. 27, 1970     J. H. TANZER     3,491,862
TRANSMISSION RATIO CONTROL MECHANISM FOR A TRACTOR DRIVELINE
Filed July 17, 1968     6 Sheets-Sheet 6

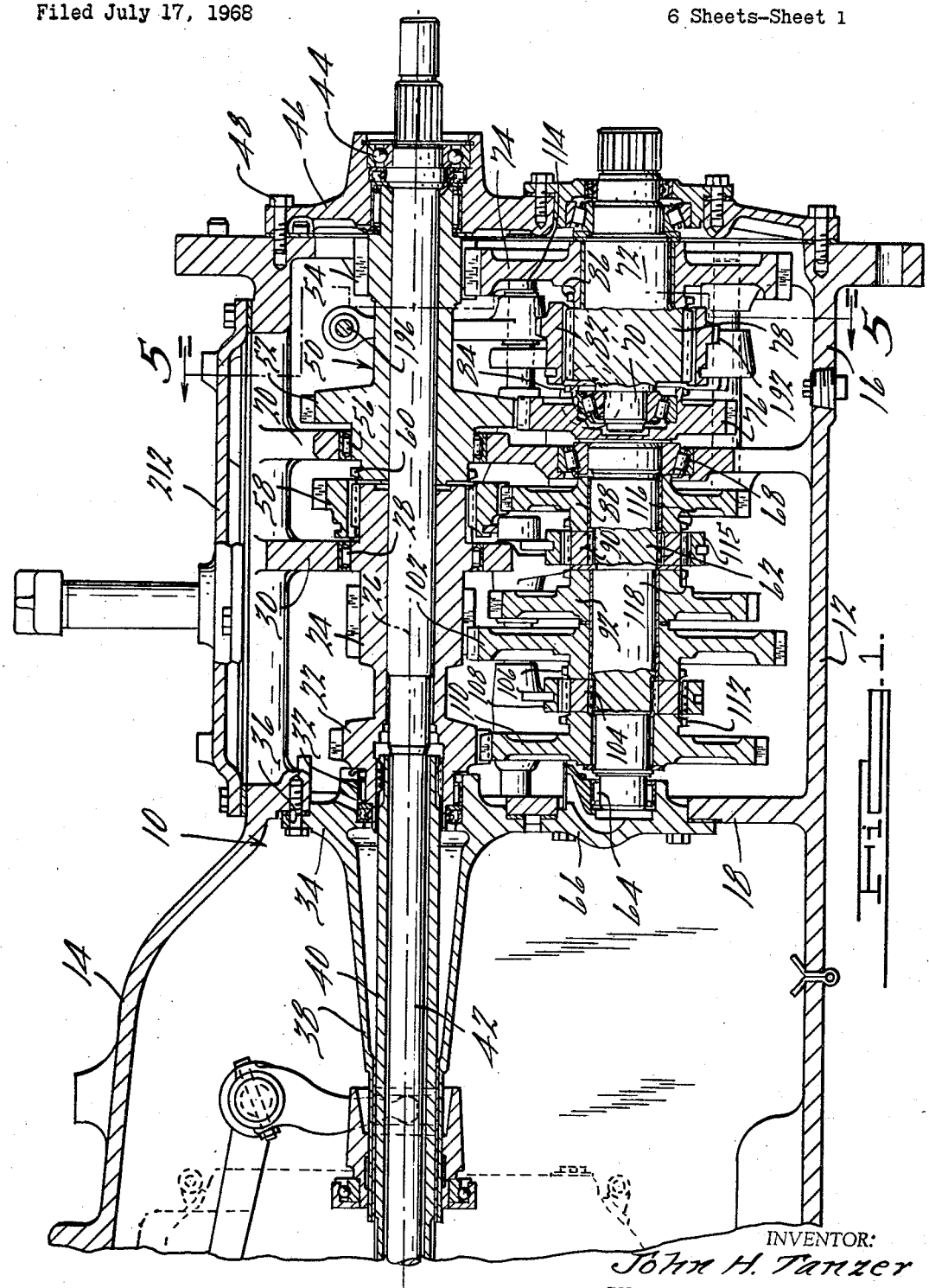

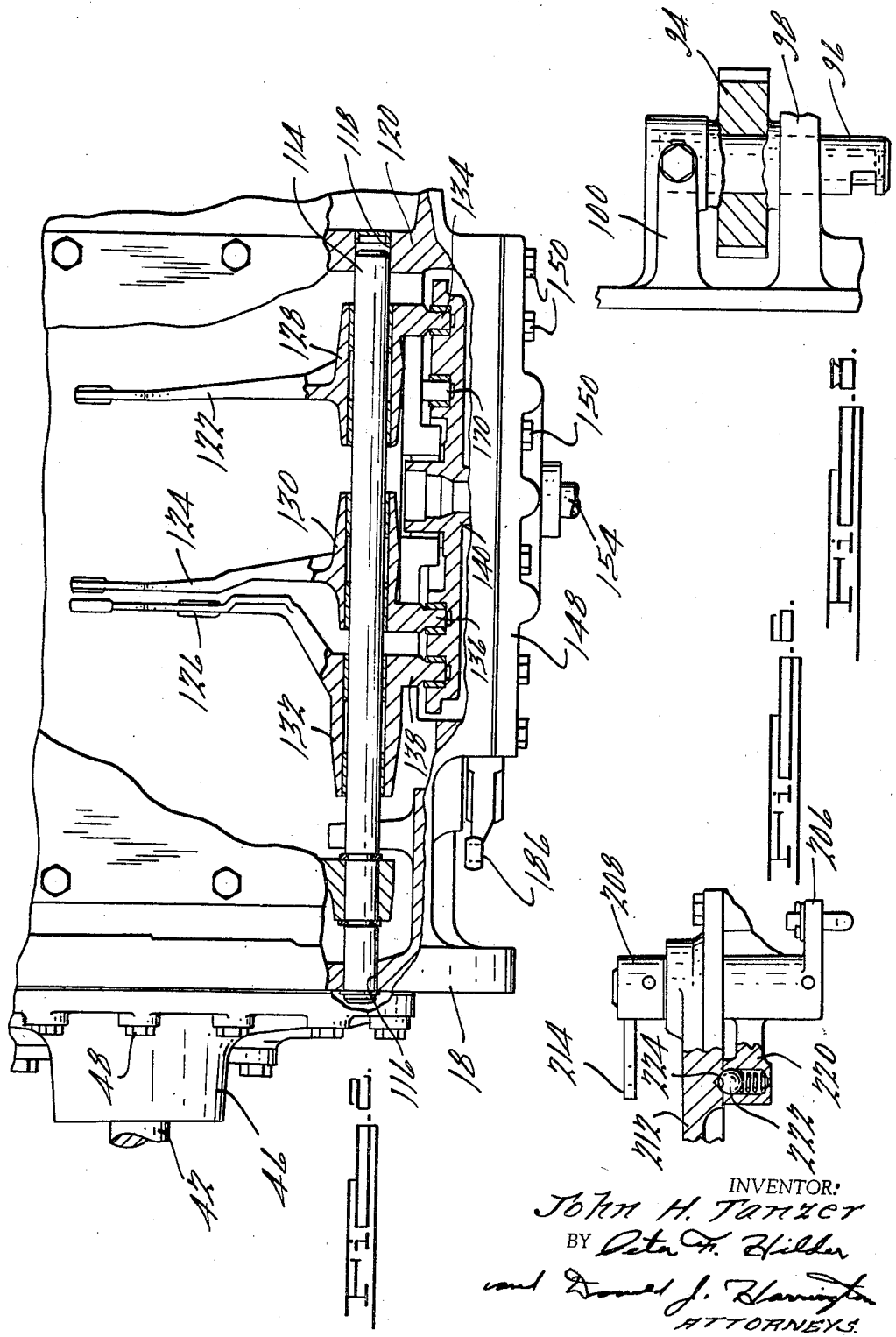

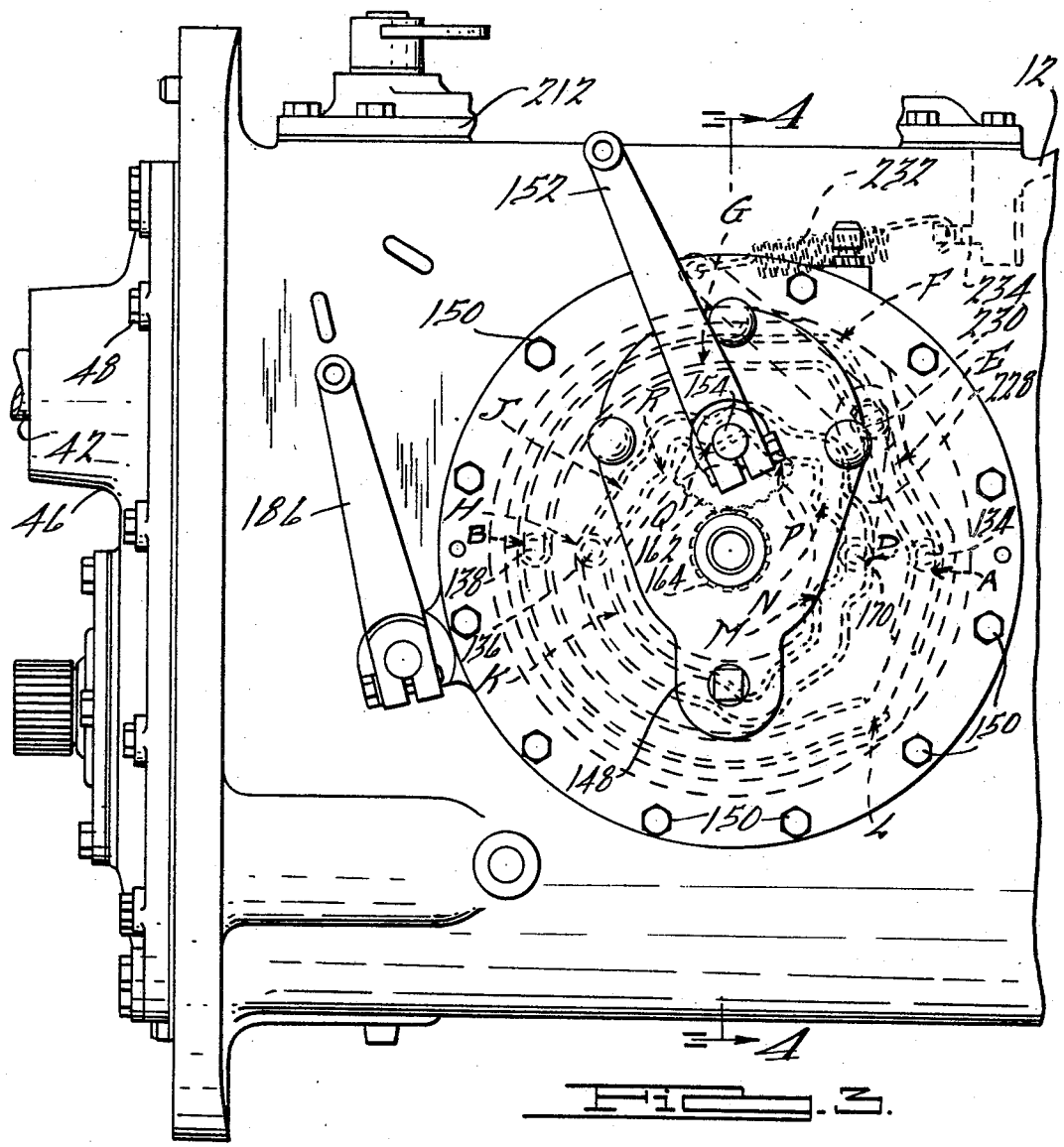

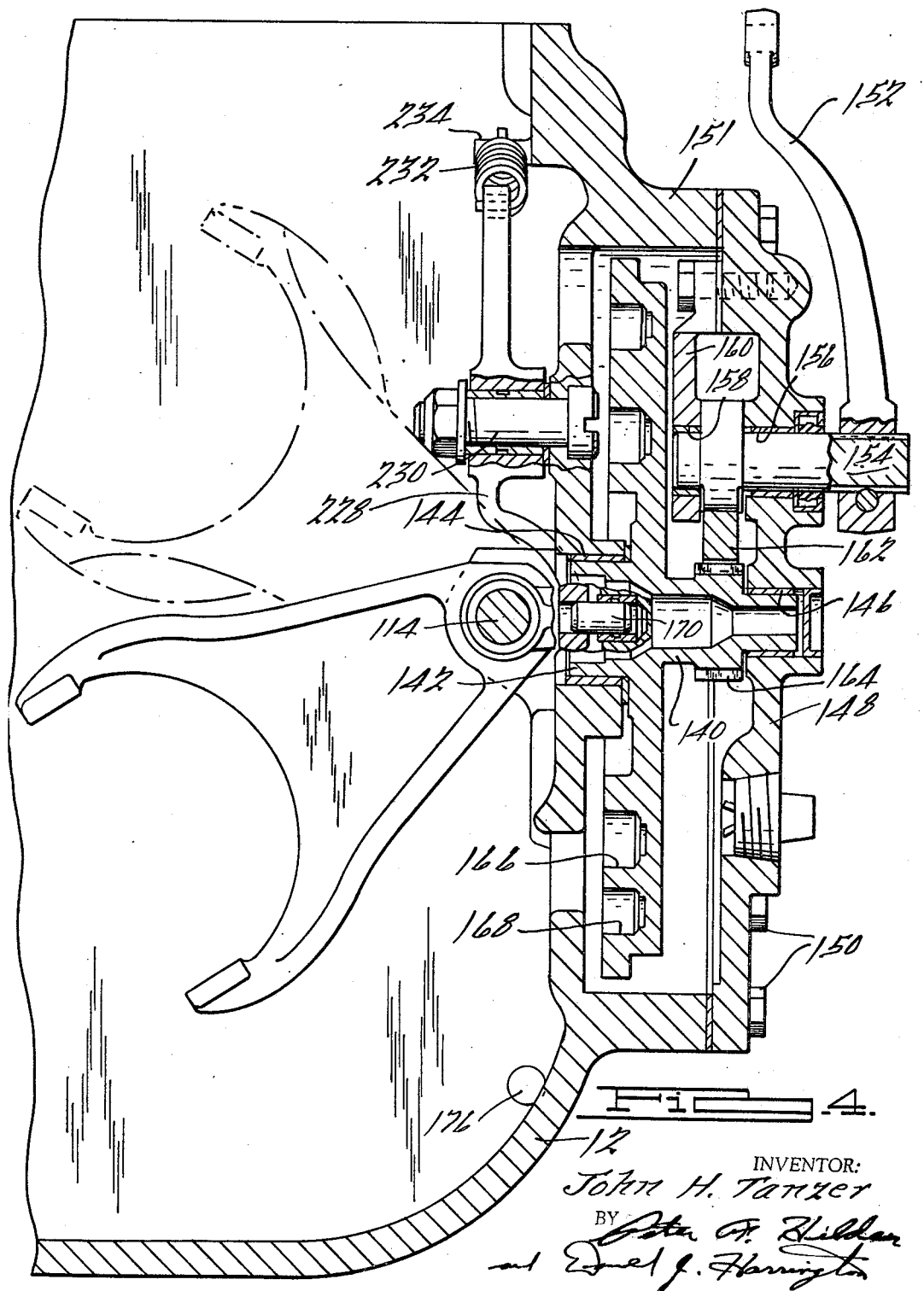

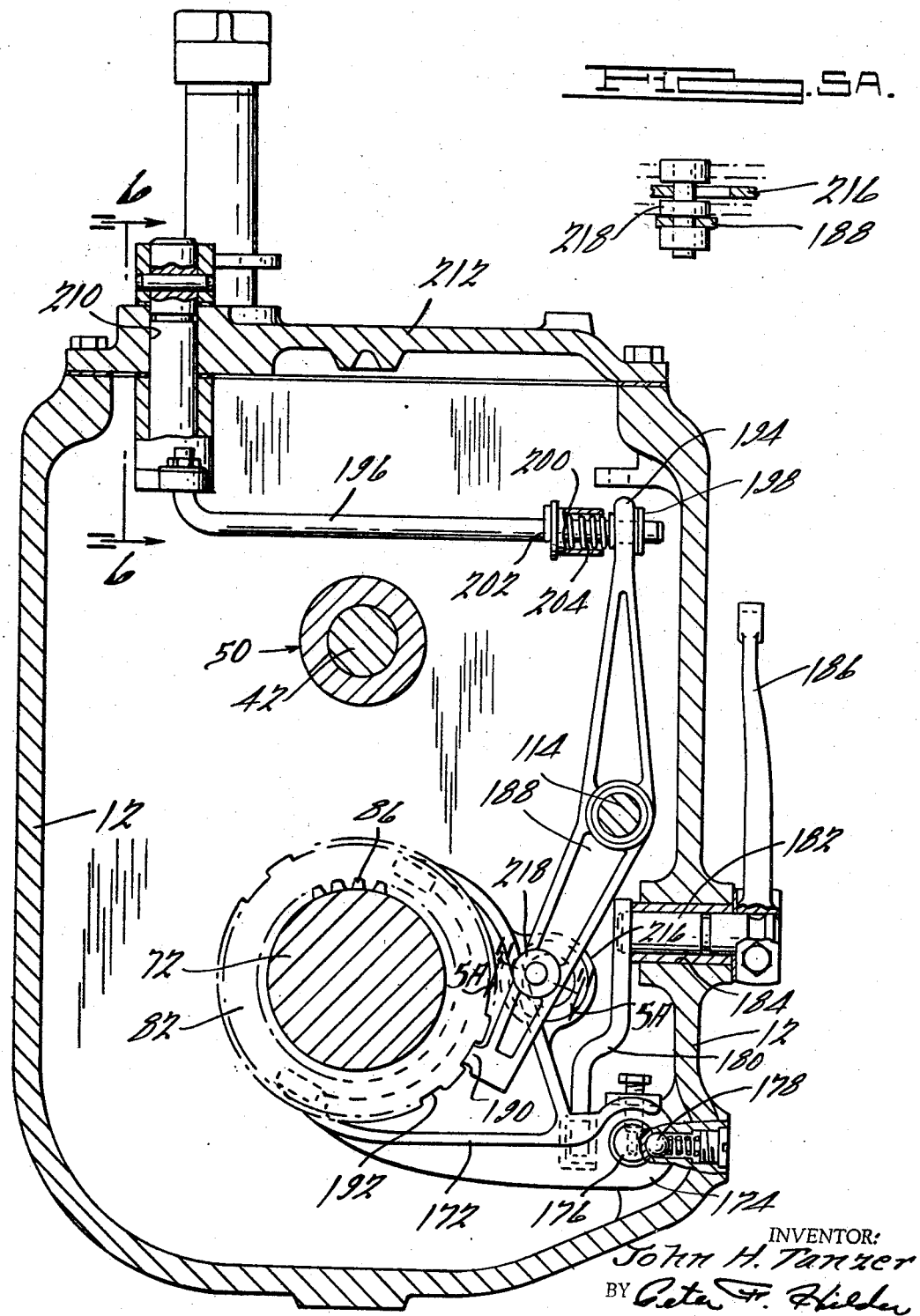

| Gear | Gear Box Ratio | Max. Draw Bar Pull-Lbs. | Land Speed M.P.H. |
|---|---|---|---|
| R₂ | -2.228 | 5.080 | 7.42 |
| R₁ | -7.34 | 11.000 | 2.26 |
| 1 | 9.129 | 11.000 | 1.81 |
| 2 | 6.467 | 11.000 | 2.56 |
| 3 | 4.799 | 9.820 | 3.85 |
| 4 | 3.214 | 7.330 | 5.16 |
| 5 | 2.774 | 6.330 | 5.97 |
| 6 | 1.963 | 4.480 | 8.42 |
| 7 | 1.306 | 2.980 | 12.68 |
| 8 | .976 | 2.225 | 16.90 |

INVENTOR:
John H. Tanzer
BY
ATTORNEYS.

United States Patent Office 3,491,862
Patented Jan. 27, 1970

3,491,862
TRANSMISSION RATIO CONTROL MECHANISM FOR A TRACTOR DRIVELINE
John H. Tanzer, Garden City, Mich., assignor to Ford Motor Company, Dearborn, Mich., a corporation of Delaware
Filed July 17, 1968, Ser. No. 745,630
Int. Cl. B16h 15/04
U.S. Cl. 192—4                10 Claims

ABSTRACT OF THE DISCLOSURE

A transmission control system for a multiple ratio, geared, transmission mechanism comprising a single cam operator connected to each of several transmission shift forks for the transmission gearing, a detent element engageable with a separate cam portion of the cam operator for establishing selectively the several operating positions corresponding to the transmission ratios, and an interlock connection between transmission park brake and a cam operator whereby simultaneous operation of the torque delivery gearing and the park brake is avoided.

GENERAL DESCRIPTION OF THE INVENTION

My invention is adapted especially to be used in the driveline of an "off-the-road" vehicle such as an agricultural tractor. It includes mechanical ratio control members adapted to select the transmission ratio shifting functions in a multiple-ratio, geared, transmission mechanism in the driveline.

The transmission mechanism comprises a power input shaft which is connected to the tractor engine crankshaft through a selectively engageable neutral clutch, first torque delivery gearing mounted rotatably in the transmission housing for rotation about the axis of said input shaft, and countershaft gearing mounted for rotation on a countershaft situated in parallel disposition with respect to the input shaft axis. The countershaft gearing includes gear elements connected driveably to the main transmission gearing. The various gear elements can be clutched or declutched with respect to their torque delivery shafts as ratio changes are accomplished. Transmission shift forks are used to engage the various toqrue delivery clutches for the gear elements.

Separate final drive gearing is disposed between the driven shaft and the output gear element to effect a high speed range and a low speed range for the tractor driveline. This requires engagement and disengagement of a sliding clutch sleeve with respect to clutch teeth carried by adjacent torque delivery gear elements.

The final drive gearing can be conditioned for operation in either the high speed range or the low speed range by means of a control lever that is independent of the ratio control elements for the main transmission gearing. The drive range desired by the opera'or is chosen in advance. The various ratios in the main tranmsission gearing within either of the two chosen drive ranges are accomplished by means of the improved cam operated ratio controlling mechanism of my invention.

I have provided a single shift-controlling cam operator in the form of a disc having multip!e tracks, each track receiving cam followers which are connected to the ratio controlling shift forks. The cam grooves formed in the cam operator establish a controlled motion pattern for the cam followers and the shift forks as the cam disc is rotated.

One of the cam grooves receives a detent member. That cam groove is provided with detent locations that establish the various operating positions for the shift forks to condition the transmission for operation in any one of four forward driving speed ratios or a single reverse ratio.

Selection of the high range and the low range is made by a linkage mechanism that is independent of the ratio selecting shift forks for the main transmission gearing. When the high-low range selector mechanism is conditioned for neutral, the power flow path between the engine and the driven shaft is interrupted. At this time a parking pawl may be brought into registry with parking gear teeth carried by the driven shaft. The parking pawl is actuated by a park lever. An interlock mechanism prevents simultaneous operation of the parking pawl and the high-low range selector mechanism when the latter is in any position other than the neutral position. Provision is made also for preventing the pawl from moving into registry with the parking gear teeth under a spring preload if the high-and-low range selector linkage is moved from the high range position through the neutral position to the low position or, conversely, from the low range position through the neutral position to the high position.

BRIEF DESCRIPTION OF THE FIGURES OF THE DRAWINGS

FIGURE 1 shows in longitudinal cross sectional form a main gearing assembly capable of incorporating the improved ratio shifting mechanism of my invention.

FIGURE 2 is a plan view, partly in section, showing the ratio shift forks and the cam operator for shifting the forks from one operating position to another.

FIGURE 3 shows a side elevation veiw of the transmission mechanism of FIGURES 1 and 2, with portions of the cam operating mechanism for the shift forks shown in phantom.

FIGURE 4 is a cross sectional view taken along the plane of section line 5—5 of FIGURE 1.

FIGURE 5 is a view taken along section line 5—5 of FIGURE 1.

FIGURE 5A is a view taken along section line 5A—5A of FIGURE 5.

FIGURE 5B is a chart showing typical performance factors for each ratio.

FIGURE 6 is a cross sectional view taken along the plane of section line 6—6 of FIGURE 5.

FIGURE 8 is a reverse drive pinion for the structure of FIGURE 1.

PARTICULAR DESCRIPTION OF THE INVENTION

Figures 7, 8B:
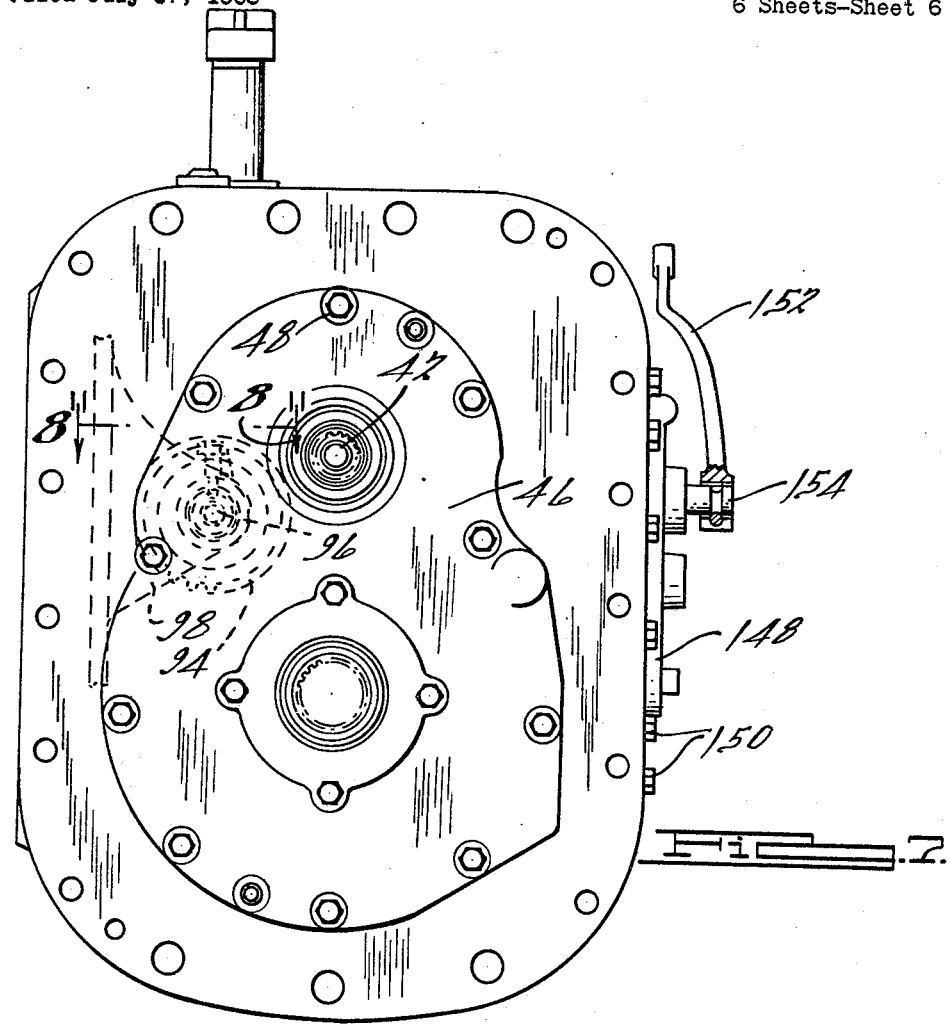
FIGURE 7 is an end view of the transmission structure of FIGURE 1.

In FIGURE 1 numeral 10 designates generally a housing for a multiple-ratio, geared, transmission mechanism in a tractor driveline. It includes a main housing portion 12, a clutch housing portion 14 and a final drive portion 16.

The housing portions 12 and 14 are separated oy a forward wall 18, and housing portions 12 and 16 are separated by a rearward wall 20.

A pair of power input gears 22 and 24 is mounted for rotation in unison about axis 26. One end of the common gears 22 and 24 is journalled by bearing 28 in a bearing opening formed in an intermediate wall 30 of the housing portion 12. The left-hand end of the common gears 22 and 24 is journalled by means of bearing 32 in a bearing opening formed in an end cover plate 34 secured by bolts shoulder 36 on wall 18.

Cover plate 34 is provided with a clutch support extension sleeve 38. This sleeve carries slidably a clutch throwout bearing for a transmission neutral clutch which connects and disconnects the crankshaft of an internal combustion engine and power input sleeve shaft 40. This sleeve shaft is supported by extension 38 and is splined at its right-hand end to the internally splined hub of gear 22. A power take-off shaft 42 extends through sleeve shaft 40 and is journalled by bearing 44 located in a bearing opening formed in end plate 46 secured by bolts 48 to the housing portion 16.

Final drive gearing 50 is mounted in the housing portion 16. It includes gear element 52 and a relatively reduced pitch diameter gear element 54. These are arranged for rotation in unison. The left end of the gearing 50 is journalled by bearing 56 in a bearing opening formed in end wall 20.

The common gear elements 22 and 24 are provided with an extension having external spline teeth. These register with internal spline teeth formed in gear 58. External clutch teeth 60 are formed on the hub of gear 52 adjacent gear 58. When the gear 58 is moved on its spline in a right-hand direction, the internal clutch teeth register with the external clutch teeth 60. This connects directly gear elements 52 and 54 to the power and input shaft 40.

A countershaft 62 is journalled rotatably about an axis parallel to the axis 26. Its left-hand end is journalled by bearing 64 in a bearing opening formed in bearing support 66, which in turn is joined to forward wall 18. The right-hand end of the countershaft 62 is journalled rotatably by means of bearing 68 in a bearing opening formed in transmission wall 20.

The right-hand end of the shaft 62 is provided with a bearing opening which receives one end 70 of output shaft 72. Another final drive output gear 76 is situated directly adjacent to the clutch hub 28, the shaft 72 being formed integrally with the hub 78.

External splines are formed on the hub 78. These register with internal splines formed on clutch sleeve 82. External clutch teeth 84 are carried by gear 76. These register with the internal spline teeth of sleeve 82 when the latter is shifted in a left-hand direction, thereby locking the gear 76 to the shaft 72.

When the sleeve 82 is shifted in a right-hand direction, gear 76 becomes disconnected from shaft 72 and sleeve 82 becomes engaged drivably with clutch teeth 86 carried by gear 74. This locks gear 74 to the shaft 72.

Gear 76 engages continuously the gear 52. Gear 88 is journalled rotatably on shaft 62 between bearing 68 and clutch hub 90, the latter being splined to the shaft 62. A reverse gear 92 is journalled on a shaft adjacent the hub 90. It meshes with reverse drive pinion 94 shown in FIGURE 8. This pinion in turn is mounted on pinion shaft 96 supported by bosses 98 and 100 which form a part of the housing 12. Pinion 94 also meshes with input gear 24.

A first speed ratio gear 102 is journalled the shaft 62. The clutch hub 104 is splined directly to the shaft 62. It is provided with external spline teeth which are situated directly adjacent external clutch teeth 106 formed on gear 102. Clutch sleeve 108 has internal spline teeth that register with the external teeth of hub 104.

The second speed ratio gear 110 is journalled on the shaft 62 adjacent hub 104. It meshes continuously with power input gear 22. Gear 110 is formed with external clutch teeth 112 which are engaged by the internal spline teeth of sleeve 108 when the latter is shifted in a left-hand direction, thus locking the gear 110 to the shaft 62. When the sleeve 108 is shifted in a right-hand direction, gear 102 becomes connected directly to the shaft 62.

Hub 90 is provided with an internally splined clutch sleeve 115 which, when it is shifted in a right-hand direction, drivably engages clutch teeth 116 formed on gear 88 thereby locking gear 88 to the shaft 62.

This sleeve 115, as it is shifted in a left-hand direction, drivably engages clutch teeth 118 formed on gear 92 thereby locking gear 92 to the shaft 62, during reverse drive operation.

During operation, either one of two drive ranges is available. A low speed drive range is obtained by shifting sleeve 82 in a right-handed direction thereby locking through the clutch teeth 86 the gear 74 to the shaft 72. At that time the output torque received by gear 74 is multiplied by the gear elements 52 and 54 as power is transmitted to the gear 74.

Operation in high speed range is accomplished by shifting the sleeve 82 in a left-hand direction thereby locking directly to the gear 76 the shaft 72. The forward drive gears 52 and 54 thus are inactive.

A first gear ratio in either of the drive ranges is obtained by shifting the sleeve 108 in a right-hand direction thereby causing engine power to be delivered through shaft 40 and through gears 24 and 102 to the shaft 62, the latter being connected to the shaft 72 either directly through the clutch teeth 84 or through the final drive gearing and clutch teeth 86 depending upon the position assumed by the sleeve 82.

The second speed ratio is obtained by shifting sleeve 108 in a left-hand direction thereby disengaging the teeth 106 and engaging instead the teeth 112 which lock the gear 110 to the shaft 62. Engine torque then is delivered from shaft 40 through gears 22 and 110 to the shaft 62 where it is transferred to the shaft 72 in the manner described.

The third speed ratio is achieved by moving the sleeve 115 in a right-hand direction until gear 88 becomes connected to the shaft 62. Engine torque then is delivered through the shaft 40 and to gear 58, which meshes continuously with the gear 88.

Whenever one of the clutch sleeves is in a clutch engaging position, each of the other sleeves is then in a clutch disengaged or neutral position.

Fourth speed operation is achieved by shifting gear 58 into clutching engagement with clutch teeth 60, thereby locking gear 52 to the power input shaft 40. Gear 52 in turn drives gear 76, which is connected to the power input shaft 72 during operation in the high speed drive range. Gear 54 is connected directly to the gear 52 and to the meshing gear 74, which is connected to the shaft 72 through the clutch sleeve 82 during operation in the low speed range.

During low speed ratio operation in either drive range, clutch sleeve 90 is shifted in a left-hand direction, thus locking the reverse gear 92 to the shaft 62. Power is delivered then from the power input shaft 40 through the gear 24, through a reverse drive pinion 94, through reverse gear 92 and shaft 62 and finally through the final drive gearing to the output shaft 72.

In the FIGURES 2, 3 and 4 I have shown the sliding rail shift fork assembly for controlling the various ratio shifts described in the foregoing paragraphs. A shift rail is identified in FIGURES 2 and 4 by reference character 114. The rail 114 is end supported in openings 116 and 118 formed respectively in forward wall 18 and in rearward wall 120. A 1–2 shift fork 122, a third and reverse shift fork 124 and a fourth speed ratio shift fork 126 are supported by the rail 114. Fork 122 includes a collar 128 slidably situated on the rail 114. Fork 124 is provided with a collar 130, and a similar collar 132 is formed on fork 126. Each collar 128, 130 and 132 is adapted to receive the rail 114.

A cam follower 134 extends from the collar 128, and similar cam followers 136 and 138 extend from the collars 130 and 132, respectively. The collars are in the form of pins or stub shafts, the ends of which carry bushings or rollers. The cam followers are received in grooves formed in a cam plate 140. The plate 140 is circular and is provided with a central hub 142 which is journalled by means of a bushing in bearing opening 144 formed in a side wall portion of the housing 12. The hub is provided with an extension which is journalled in bearing opening 146 formed in end plate 148. This in turn is secured by bolts 150 to a boss 151 formed on the housing 12.

The transmission shift lever is identified by reference character 152. It is keyed or pinned to shaft 154, which is journalled in turn in opening 156 formed in the plate 148 and in opening 158 formed in a bearing support plate 160 secured to the inner face of the plate 148. Shaft 154 carries a gear 162 which meshes with a gear 164 carried by the hub of the cam plate.

A cam plate is provided with two cam grooves which are best seen in FIGURE 3. The grooves are identified in FIGURES 2, 3 and 4 by reference characters 166 and 168. The cam followers shown in FIGURE 4 at 136 and 138 are received in these grooves. Cam follower 134 is located in groove 168 and, as seen in the view of FIGURE 3, assumes location A. Cam follower 138 also is located in groove 168, but it is displaced 180° away from the cam follower 134. It is shown in FIGURE 3 at location B. Cam follower 136 located in cam groove 166 is positioned at location H in FIGURE 3. A detent roller 170 also is positioned in the groove 166 and is located at D in FIGURE 3.

The shape of the grooves 166 and 168 are such that the cam followers are moved in an axial direction with respect to the rail 114. As the cam plate 140 is rotated upon displacement of any one of the cam followers, the other cam followers are caused to assume a neutral position. Upon continued movement of the cam plate, the first cam follower will be restored to the neutral position as a second cam follower is shifted axially. The shape of the grooves is determined so that only one cam follower will be shifted in either one axial direction or the other as the other cam followers retain their neutral positions.

When cam follower 134 is at location A, shift fork 122 is in its neutral position. If the cam plate 140 is rotated so that the cam follower 134 assumes the track position as shown at E, the shift fork 122 will be shifted to the first speed ratio position with the sleeve 108 engaging the clutch teeth 106. Upon continued rotation of the cam plate 140 in a clockwise direction as seen in FIGURE 3, the cam follower 134 will assume the track position F, at which time the sleeve 108 is shifted into clutching engagement with clutch teeth 112 thereby establishing a second speed ratio position. Further movement of the cam plate 140 in a clockwise direction will cause the cam follower 134 to assume a constant radius location at which time the sleeve 108 assumes a neutral position. Continued movement of the cam plate 140 in a clockwise direction will not result in shifting movement of the cam follower 134 because the track location G is formed with the constant radius.

When the cam follower 134 is in the cam track location A, cam follower 138 is in cam location H at which time the shift fork 124 is in a neutral position. As the cam plate 140 is rotated in a counter clockwise direction to cam groove location J, fork 124 will assume the reverse drive position.

If the cam plate 140 is moved so that the follower 136 is received in the groove location K, shift fork 124 maintains a neutral position because the groove location K is formed with a constant radius.

When the cam plate 140 assumes the position shown in FIGURE 3, cam follower 138 is in a neutral position. If the cam plate 140 is rotated in a clockwise direction, follower 138 evenutually will move to cam track location L. At all other times the cam follower 138 assumes a neutral position.

The various operating positions for the shift forks are established by detent cam follower 170 at angularly spaced locations. Cam track 166 is formed with detent locations that receive the follower 170. A resistance is offered to continued movement of the cam follower through each of the detent locations. This resistance is felt by the operator as he moves the lever 152.

The detent position establishing reverse drive location is shown at M. The detent position that establishes the first speed ratio position is shown at N. The detent position that establishes a second speed ratio position is shown at P, and the third and fourth detent positions are shown at Q and R respectively.

The cam plate 140 is rotated upon rotation of the lever 152 because of the geared connection between lever 152 and the hub of the plate 140.

Shown in FIGURE 5 is a shift fork 172 which is provided with a collar 174 slidably received on supporting rail 176. This rail runs parallel to the rail 114 for the other shift forks. The rail 176 is provided with detent recesses that register with detent ball 178 situated in an adjacent boss formed in the housing 12. The collar 174 is provided with a recess that receives one end of shift lever 180. The end of the shift lever 180 is secured to a pivot rod 182, which in turn is journalled for oscillation in bearing opening 184.

The rod 182 extends outwardly and is connected operatively to the high-low shift arm 186. As the arm 186 is moved in one direction, the shift fork 172 moves sleeve 82 in a left-hand direction thereby establishing a high speed range. Upon movement of the arm in the opposite direction, the sleeve 82 shifts into clutching engagement with teeth 86, thereby causing the transmission to operate in a low speed range.

Shown also in FIGURE 5 is a parking pawl 188. The lower end of the pawl 188 is provided with a tooth 190 which is received in parking brake teeth recesses 192 formed on the outer periphery of sleeve 82. This can best be seen in FIGURE 1.

The pawl 188 of FIGURE 5 is pivoted on the shaft 114 which provides a common support for the shift forks 122, 124, and 126. One end of the pawl 188 is provided with an eyelet 194 which receives one end of parking brake rod 196. Movement of the eyelet 194 in a right-hand direction as shown in FIGURE 5 is limited by stop pin 198. A spacer in the form of a sleeve 200 is situation between eyelet 194 and a second stop pin 202 carried by rod 196. A tension spring 204 is situation between the stop 202 and the side of the eyelet 194. It is received within the spacer 200.

The opposite end of the rod 196 is received in an opening in an arm 206 as seen in FIGURE 6. The arm 206 is carried by shaft 208 which is journalled in an opening 210 in a cover plate 212. This in turn is bolted to the top of the housing 12 to cover an access opening.

The outward end of the shaft 208 carries a parking brake actuating lever 214.

The shift fork 172 is provided with an enlarged eyelet 216 within which is received an interlock member 218. This lever is provided with a peripheral groove in which the surrounding eyelet 216 is received when the shift fork 172 is in the neutral position. If the parking pawl 188 is moved in a clockwise direction as seen in FIGURE 5, the tooth 190 will enter a space 192 between two parking brake teeth. At that time the groove in the circular member 218 will receive the eyelet 216. However, if the fork 172 is in either the high range position or the low range position at that time, interference will occur between the member 218 and the eyelet 216 which will prevent engagement of the pawl 188. This prevents simultaneous actuation of the parking brake and the torque transmitting clutches of the transmission gearing.

Pawl 188 is oscillated in one direction or the other by rod 196. Its braking position is determined by a detent arm 220 carried by the shaft 208. This arm carries a detent pawl 222 which registers with a detent recess 224 in the housing cover plate 212.

If the pawl tooth 190 is out of registry with the spaces 192 between the parking brake teeth, a spring 204 becomes compressed after the tractor moves slightly to cause the output shaft to rotate, the pawl tooth 190 will snap into place between two teeth at the first opportunity. Thereafter, the output shaft will be locked to the housing.

If the operator attempts to actuate the parking brake when the shift fork 172 is in either the high-range position or the low-range position, the spring 204 will become compressed. The interlock 218 and 216 will precent movement of the tooth 190 into engagement with the parking brake teeth. Continued movement of the rod 196 in a right-hand direction as seen in FIGURE 5A, however, is prevented by the spacer 200. Engagement of the spacer 200 with the eylet 194 occurs prior to the time that the detent arm 220 reaches the braking detent position. Thus the spring 204 will return the parking brake arm 214 to the original non-braking position as soon as the operator relieves his braking effort.

Without the presence of the spacer 200, it might be possible to preload the spring 204 when the shift fork 172 is in either the high-range position or the low-range position as the parking brake arm 214 is moved to the parking brake actuating position. If this were to occur, the tooth 190 would snap into position when the operator would shift the high-low shift fork 172 from one position to the other through the neutral position.

Detent follower 170 is carried by detent arm 228 which is pivoted on the shaft 230. The other end of the arm 228 is connected to tension spring 232, which is anchored to stationary boss 234 carried by the housing 12. Thus the detent arm 228 normally is biased in a clockwise direction as seen in FIGURE 3 so that the detent follower will engage a depression in each of the detent locations M, N, P, Q, and R, thereby establishing the various operating positions.

Having thus described a preferred form of my invention, what I claim and desire to secure by U.S. Letters Patent is:

1. A manually controlled power transmission mechanism adapted to deliver driving torque from a driving member to a driven member comprising first torque delivery gears situated for rotation about a first axis, second torque delivery gears situated for rotation about an axis parallel to the axis of said first gears, said first gears being situated in meshing engagement with said second gears, one of said first gears being connected in the driving member, clutch means including axially movable clutch elements for completing a driving connection between selected gears and said driven member, a shift rail extending in a direction parallel to the axis of said first gears, shift forks slidably supported on the shift rail and engageable with said clutch elements, a rotatable cam plate mounted for rotation adjacent to said shift rail, said plate having cam grooves formed on one side thereof, said shift forks having cam followers carried thereon and received within said cam grooves, a detent mechanism comprising a cam detent groove formed in said cam plate, a cam follower in said detent groove, said detent groove being formed with detent locations that establish predetermined angular positions for said cam plate corresponding to each of the several operating positions for said shift forks, said cam grooves having predetermined configurations whereby rotary displacement of said cam plate will effect sequential shifting movement of said shift forks so that a single shift fork will be engaged at any angular position of said cam plate that corresponds to a position determined by said detent mechanism.

2. A manually controlled power transmission mechanism adapted to deliver driving torque from a driving member to a driven member comprising first torque delivery gears situated for rotation about a first axis, second torque gears situated for rotation about an axis parallel to the axis of said first gears, said first gears being situated in meshing engagement with said second gears, one of said first gears being connected in the driving member, clutch means including axially movable clutch elements for completing the driving connection between selected gears and said driven member, a shift rail extending in a direction parallel to the axis of said first gears, shift forks slidably supported on the shift rail and engageable with said clutch elements, a rotatable cam plate mounted for rotation adjacent said shift rail, said cam plate having cam grooves formed on one side thereof, said shift forks having cam followers received within said cam grooves, a cam detent groove formed in said cam plate, a cam follower in said detent groove, said detent groove being formed with detent locations that establish predetermined angular positions for said cam plate corresponding to each of the several operating positions for said shift forks, said cam grooves having predetermined configurations whereby rotary displacement of said cam plate will effect sequential shifting movement of said shift forks so that a single shift fork will be engaged at any angular position of said cam plate that corresponds to a position determined by said cam plate detent groove, a parking gear connected to said driven member, a parking pawl, means for pivoting said parking pawl in said housing, a pawl tooth at one end of said parking pawl engageable with said parking gear, manually operable linkage means for rotating said pole about its pivotal axis, and an interlock means for preventing movement of said pawl to a parking brake actuated position including interengageable parts, one part being in the line of movement of the other part when one shift fork is in operating position, one part being carried by said shift fork and the other part being carried by said pawl.

3. The combination as set forth in claim 2 wherein said first gears and second gears comprise a final-drive dual-range gear assembly and a main ratio changing gear assembly, said final-drive assembly having two final-drive output gears, one of which is connected to a torque output element of said ratio changing gear assembly, each of said final drive output gears being connected to a separate one of said first gears, clutch means including an axially moveable clutch sleeve for connecting each of said final-drive output gears to said driven member, one shift fork assembly registering with said clutch sleeve in an effort to shift the latter in either axial direction to effect clutching engagement and disengagement of said final-drive output gears with respect to said driven member, said one shift fork and said parking pawl having interengageable interlock parts, one part being carried by said one shift fork and the other part being carried by said pawl, said one part moving into the line of motion of the other part as said one shift fork assumes a clutch engaged position.

4. The combination as set forth in claim 2 wherein one end of said parking pawl has an opneing formed therein, a brake operating rod received in said opening, a stop carried by said rod for limiting the motion of said pawl with respect to said rod in one direction, spring means carried by said rod for normally urging said pawl into engagement with said stop, and a spacer carried by said rod for limiting relative motion of said rod with respect to said pawl whereby said rod is inhibited from moving to a fully-engaged brake-applied position when said interlock parts are in an interfering position.

5. The combination as set forth in claim 3 wherein one end of said parking pawl has an opening formed therein, a brake operating rod received in said opening, a stop carried by said rod for limiting the motion of said pawl with respect to said rod in one direction, spring means carried by said rod for normally urging said pawl into engagement with said stop, and a spacer carried by said rod for limiting relative motion of said rod with respect to said pawl whereby said rod is inhibited from moving to a fully-engaged brake-applied position when said interlock parts are in an interfering position.

6. The combination as set forth in claim 1 wherein said detent mechanism comprises a detent arm pivoted on a stationary portion of some mechanism and carrying said detent follower, spring means acting on said detent arm for normally biasing the detent follower toward a detent recess engaging position whereby resistance is applied to movement of said cam plate from one operating position to another.

7. The combination as set forth in claim 2 wherein said detent mechanism comprises a detent arm pivoted on a stationary portion of some mechanism and carrying said detent follower, spring means acting on said detent arm for normally biasing the detent follower toward a detent recess engaging position whereby resistance is applied to movement of said cam plate from one operating position to another.

8. The combination as set forth in claim 3 wherein said detent mechanism comprises a detent arm pivoted on a stationary portion of some mechanism and carrying said detent follower, spring means acting on said detent arm for normally biasing the detent follower toward a detent recess engaging position whereby resistance is applied to movement of said cam plate from one operating position to another.

9. The combination as set forth in claim 4 wherein said detent mechanism comprises a detent arm pivoted on a stationary portion of some mechanism and carrying said detent follower, spring means acting on said detent arm for normally biasing the detent follower toward a detent recess engaging position whereby resistance is applied to movement of said cam plate from one operating position to another.

10. The combination as set forth in claim 5 wherein said detent mechanism comprises a detent arm pivoted on a stationary portion of some mechanism and carrying said detent follower, spring means acting on said detent arm for normally biasing the detent follower toward a detent recess engaging position whereby resistance is applied to movement of said cam plate from one operating position to another.

References Cited

UNITED STATES PATENTS

| | | | |
|---|---|---|---|
| 1,715,178 | 5/1929 | Tredway | 74—337.5 X |
| 2,839,941 | 6/1958 | Rugen | 74—337.5 X |
| 3,042,162 | 7/1962 | Hause | 192—4 |
| 3,115,047 | 12/1963 | Lunn et al. | 74—359 X |
| 3,202,005 | 8/1965 | Ivanchich | 74—359 X |
| 3,300,001 | 1/1967 | Stockton | 192—4 |

ARTHUR T. McKEON, Primary Examiner

U.S. Cl. X.R.

74—337.5